8953X
T. Loud,
Piano Frame,
Patented July 7, 1835.
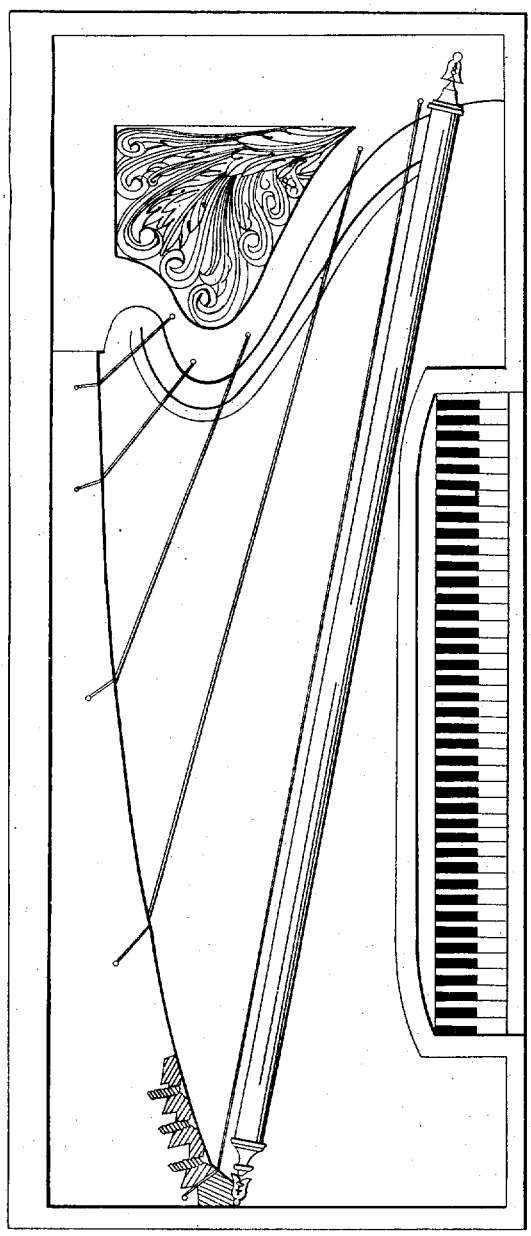
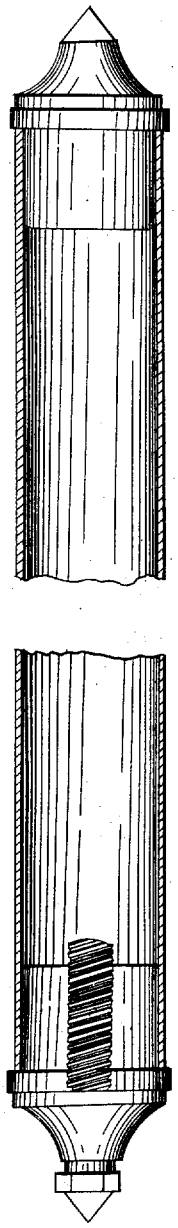
AM. PHOTO-LITHO. CO. N.Y. (OSBORNE'S PROCESS)

Thomas Loud _ Philadelphia. Pennsylvania

Letters Patent

The Schedule referred to in these Letters Patent and making part of the same containing a description in the words of the said Thomas Lond himself of his improvement in the compensating tubes of Piano Fortes To all whom it may concern. Be it known that I Thomas Loud of the City of Philadelphia in the State of Pennsylvania have invented an improvement in the mode of constructing and applying a compensation tube or tubes to Piano Fortes, and that the following is a full and exact description thereof. It is known to Piano Forte makers that what are called compensation tubes were applied to Piano Fortes some years since in London. The compensation tubes are applied for the purpose of resisting the strain of the strings by supporting the blocks to which their ends are attached and also by their expansion & contraction to compensate that of the strings resulting from change of temperature. The tubes in the English instruments are made with flat ends which rested against metal plates firmly attached to the end blocks of the Piano Forte. from the manner in which they were constructed and fixed they were liable to spring if unsupported. and to prevent this bars of wood were placed crosswise in contact with them in order to sustain them. by which arrangement the vibration of the instrument was in some degree checked and the tone of course injured. In my improvement I generally use but one compensation tube. I do not intend however to limit myself in this particular. but to use two or more should I find it advantageous to do so. my claim to improvement not being dependent upon the number of tubes but upon the manner in which they are constructed and support the strain _

When one tube only is used it must be made larger than when two or more are employed. I shall describe but one, as a competent workman will be at no loss in employing a greater number upon the same principle 4. 8953X I take a tube of iron which may be about one sixteenth of an inch thick
and an inch and a half in diameter, and either brighten and polish it
or cover it with a thin tube as steel brass or other metal drawn upon
it. on each end of this tube I fix a cap usually of iron and having pro
jecting points of iron or steel in their centres. One of these points is upon
the projecting head of a screw tapped into the cap. these points pass into
countersunk holes in ornamental cast iron blocks. one of which is
usually cast in one piece with the metallic plate at one end and the
other secured firmly to the block containing the rest pins at the opposite
end. the particular manner of fixing them will depend upon the con
struction of the Piano Forte and upon the judgment of the workman
What I claim as my invention and wish to secure by Letters Pa
tent is the employment of points or centres to sustain the pressure in com
pensating tubes for Piano Fortes whether constructed precisely in
the manner herein set forth or in any other producing the same
result by analogous means.

Witnesses
J. C. B. Strandbridge
Thos C Loud

Thomas Loud (Patented 7 July 1835) (585 Words)

(Drawing)